(12) United States Patent
Katayama et al.

(10) Patent No.: US 6,431,989 B1
(45) Date of Patent: Aug. 13, 2002

(54) RIDE SIMULATION SYSTEM

(75) Inventors: Atsushi Katayama, Kodaira; Nobuhiko Matsukuma, Hitachi; Yoshihiro Iwama, Kokubunji; Atsuhiko Nishikawa, Mito, all of (JP); Douglas Trumbull, Sheffield, MA (US); Eric A. Wilson, Great Barrington, MA (US); Brahm Rhodes, Brookline, MA (US); Steven D. Bronson, Bradford, MA (US); Joshua D. Minges, Housatonic, MA (US); Erich A. Greenebaum, Montery, MA (US)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/429,959

(22) Filed: Oct. 29, 1999

(30) Foreign Application Priority Data

Oct. 29, 1998 (JP) .......................... 10-308741

(51) Int. Cl.[7] .............................. A63G 31/16
(52) U.S. Cl. ........................ 472/60; 472/130; 434/55
(58) Field of Search ............... 472/58, 59, 60, 472/61, 130; 434/29, 55; 52/6, 8, 9, 10

(56) References Cited

U.S. PATENT DOCUMENTS

| | | | | |
|---|---|---|---|---|
| 5,192,247 A | * | 3/1993 | Barr et al. | 472/60 |
| 5,711,670 A | * | 1/1998 | Barr | 434/55 |
| 5,716,281 A | * | 2/1998 | Dote | 472/60 |
| 5,857,917 A | * | 1/1999 | Francis et al. | 472/60 |
| 5,964,064 A | * | 10/1999 | Goddard et al. | 52/8 |
| 6,017,276 A | * | 1/2000 | Elson et al. | 472/60 |

* cited by examiner

Primary Examiner—Kien T. Nguyen
(74) Attorney, Agent, or Firm—Antonelli, Terry, Stout & Kraus, LLP

(57) ABSTRACT

In order to display distortion-free and high-precision images which give a three-dimensional appearance to many crews in a ride simulation system, there is provided a ride simulation system comprising a ride casing which is in shape of a capsule and can accept one or more people and a driving mechanism for driving this ride casing, wherein a horizontally long, curve screen is provided at the front of the interior of the ride casing, a plurality of projectors are provided at the rear of the interior of the ride casing, and because of projection on each corresponding divided area of the curve screen by means of the plurality of projectors, one picture is displayed on the curve screen.

17 Claims, 15 Drawing Sheets

FIG.7

| | A | B | C | D | E |
|---|---|---|---|---|---|
| ELLIPSE WITH VARIED WHITE/BLACK SPLIT RATIOS | WHITE−BLACK SPLIT RATIO [5:5] | WHITE−BLACK SPLIT RATIO [6:4] | WHITE−BLACK SPLIT RATIO [7:3] | WHITE−BLACK SPLIT RATIO [8:2] | WHITE−BLACK SPLIT RATIO [1:0] |
| POINT | 22 POINTS | 41 POINTS | 90 POINTS | 34 POINTS | 2 POINTS |

EXAMINATION OF SPLIT RATIOS BY COLORS WHICH WAKE THE SURFACE AREA OF AN ELLIPSE SMALL

RIDE SIMULATION SYSTEM

BACKGROUND OF THE INVENTION

The present invention relates to a ride simulation system to be placed in amusement parks, game centers, exhibitions, showrooms, various kinds of training facilities, etc.

A ride simulation system that is provided with a ride casing in which people can ride and a driving mechanism for driving the ride casing has recently been coming into rapid widespread in entertainment applications as well as training applications, so that various types of ride simulation system are known.

Such ride simulation systems create imaginary and virtual environment spaces (virtual spaces) full of a sense of realism owing to motions of the ride casing (motions in response to the operations of crews or motions based on the instructions from the outside), pictures projected within or outside the ride casing and sounds, thereby being capable of letting the crews have the virtual experiences as if they were in the created environment.

In a ride simulation system of this kind, a ride simulation system which is provided with a ride casing like a capsule projects pictures within the ride casing which makes an enclosed space and outputs voices and sounds within the ride capsule, therefore, this is very suitable for isolating the enclosed space from the outside space. However, conventionally, it is the main that a ride simulation system is for one person's use, so that much consideration has not been given to a ride simulation system provided with a ride casing in a capsule shape for many people's use.

Furthermore, conventional ride simulation systems have been lacking a little in some contrivance to make the pictures projected within the ride casing in shape of a capsule high-accuracy images full of a sense of realism, to create an environment full of a sense of realism through the bodily sensation by low sounds, and to provide operation devices suitable for the operations of crews in a moving environment. Moreover, conventional operation devices have also been lacking a little in some contrivance to diversify operations, because these operation devices have been switches which are placed in fixing grips or joysticks in the main.

In addition, conventional operation devices have also been lacking a little in some contrivance to secure safety during the comings and goings of crews to and from the ride casing and to achieve the cheerfulness of the appearance design of the ride casing.

SUMMARY OF THE INVENTION

As will be apparent from the above, the object of the present invention is to solve the above problems of the prior art.

According to the first aspect of the present invention, there is provided a ride simulation system comprising a ride casing which is in shape of a capsule and can accept plurality of people, and a driving mechanism for driving the ride casing, wherein a curve screen which is long in width is disposed at the front within the ride casing, a plurality of projectors are disposed at the rear within the ride casing, and the plurality of projectors project on corresponding divided areas of the curve screen so that one picture is displayed on the curve screen, and wherein seats are arranged in a multistage condition within the ride casing so that crews sitting on the seats are opposite to the curve screen and the seats on the front side stage are lower than those on the rear side stage, and the row of the seats on each stage is arranged so as to describe a gentle arc in order to ensure that the eyes of the crews are easily directed to near the center of the curve screen in the horizontal direction.

According to the second aspect of the present invention, there is provided a ride simulation system comprising a ride casing which is in shape of a capsule and can accept one or more people, a driving mechanism for driving the ride casing, a display screen which is disposed at the front within the ride casing to display pictures, and seats which are arranged within the ride casing so that crews sitting on the seats are opposite to the display screen, wherein a plurality of speakers are disposed at the front within the ride casing, a speaker is also disposed at the rear within the ride casing, and a speaker for body sonic purpose is disposed at anywhere of the portion under the cushion of the seat and the portion near the base of the seat.

According to the third aspect of the present invention, there is provided a ride simulation system comprising a ride casing which is in shape of a capsule and can accept one or more people, a driving mechanism for driving the ride casing, a display screen which is disposed at the front within the ride casing to display pictures, and seats which are arranged within the ride casing so that crews sitting on the seats are opposite to the display screen, wherein an operation device which a crew sitting on the seat can shift from a waiting aisle position to an operating position is provided on or near the seat.

According to the fourth aspect of the present invention, there is provided a ride simulation system comprising a ride casing which is in shape of a capsule and can accept one or more people, a driving mechanism for driving the ride casing, a display screen which is disposed at the front within the ride casing to display pictures, and seats which are arranged within the ride casing so that crews sitting on the seats are opposite to the display screen, wherein an operation device which a crew sitting on the seat can operate and a sheet driving mechanisms capable of moving the seat according to the operation by the operation device are provided on or near the seat.

According to the fifth aspect of the present invention, there is provided a ride simulation system comprising a ride casing which is in shape of a capsule and can accept one or more people, a driving mechanism for driving the ride casing, and a display screen which is disposed at the front within the ride casing to display pictures, wherein the ride casing is fabricated by combining a front side casing and a back side casing of which the external surfaces are different in light and darkness or color from each other, the ride casing has a long shape in the lateral direction as viewed from the side, and the area split ratio of the front side casing to the back side casing as viewed from the side is set at 8:2 to 6:4.

According to the sixth aspect of the present invention, there is provided a ride simulation system comprising a ride casing which is in shape of a capsule and can accept plurality of people, and a driving mechanism for driving the ride casing, wherein a screen is disposed at the front within the ride casing, a plurality of projectors are disposed at the rear within the ride casing, and the plurality of projectors project on corresponding divided areas of the screen so that one picture is displayed on the screen, and wherein each housing enclosing the projectors can be independently removed outward from the ride casing.

According to the seventh aspect of the present invention, there is provided a ride simulation system comprising a ride casing which is in shape of a capsule and can accept one or more people, a driving mechanism for driving the ride casing which is situated at the low part of the ride casing, and a platform which is arranged so as to surround the driving mechanism and has a plane top surface, wherein there is provided a plate member between a door installed at the entrance to the ride casing and a position opposed to the entrance on the platform, the plate member is capable of assuming a vertical position which prevents the comings and goings on the entrance and a lying position which allows the comings and goings on the entrance so that the plate member covers a gap between the ride casing and the platform and works as a step which connects the floor surface of the entrance with the top surface of the platform when the plate member assumes the lying position.

Incidentally, effects of the invention will naturally be apparent from the following description of embodiments.

BRIEF DESCRIPTION OF THE DRAWINGS

FIG. 7 is an explanatory diagram which shows the result of a survey by a questionnaire for many people as to which ellipse looks having the smallest surface area according to the split ratios of white and black portions when the ellipses are colored white and black.

DESCRIPTION OF THE PREFERRED EMBODIMENTS

Figure 1:
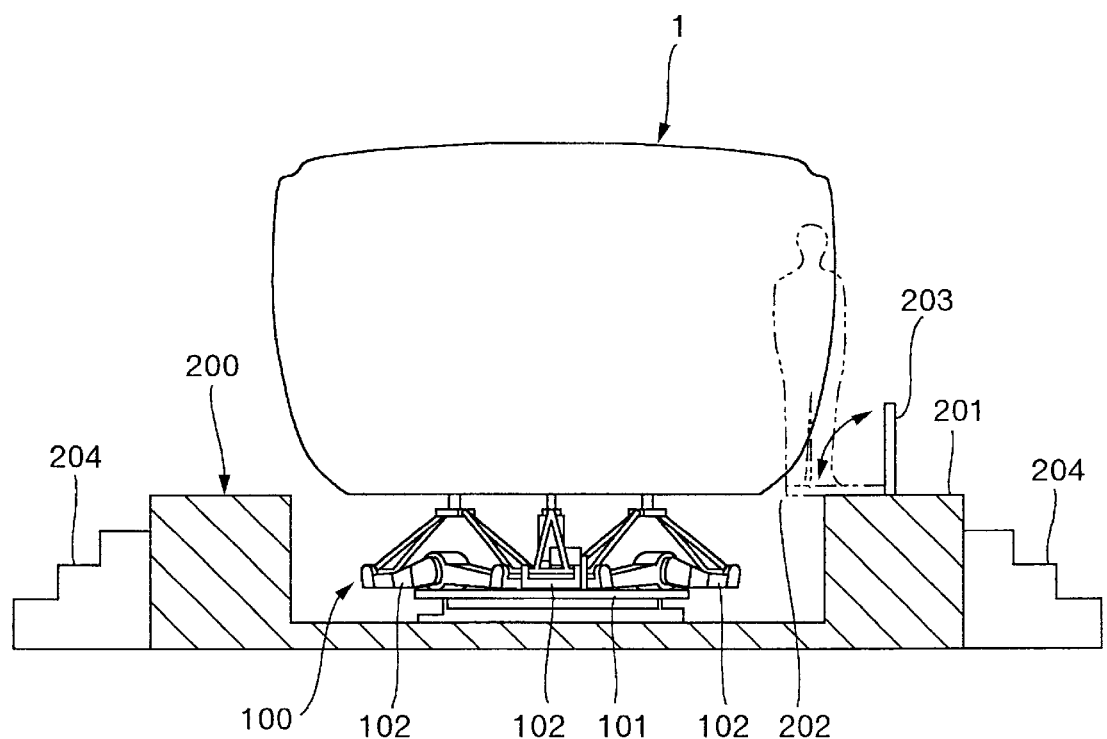
FIG. 1 is a partially cutaway front view of the general appearance of a ride simulation system related to an embodiment of the present invention.

The embodiments of the present invention are described below by referring to the drawings.

Figure 2:
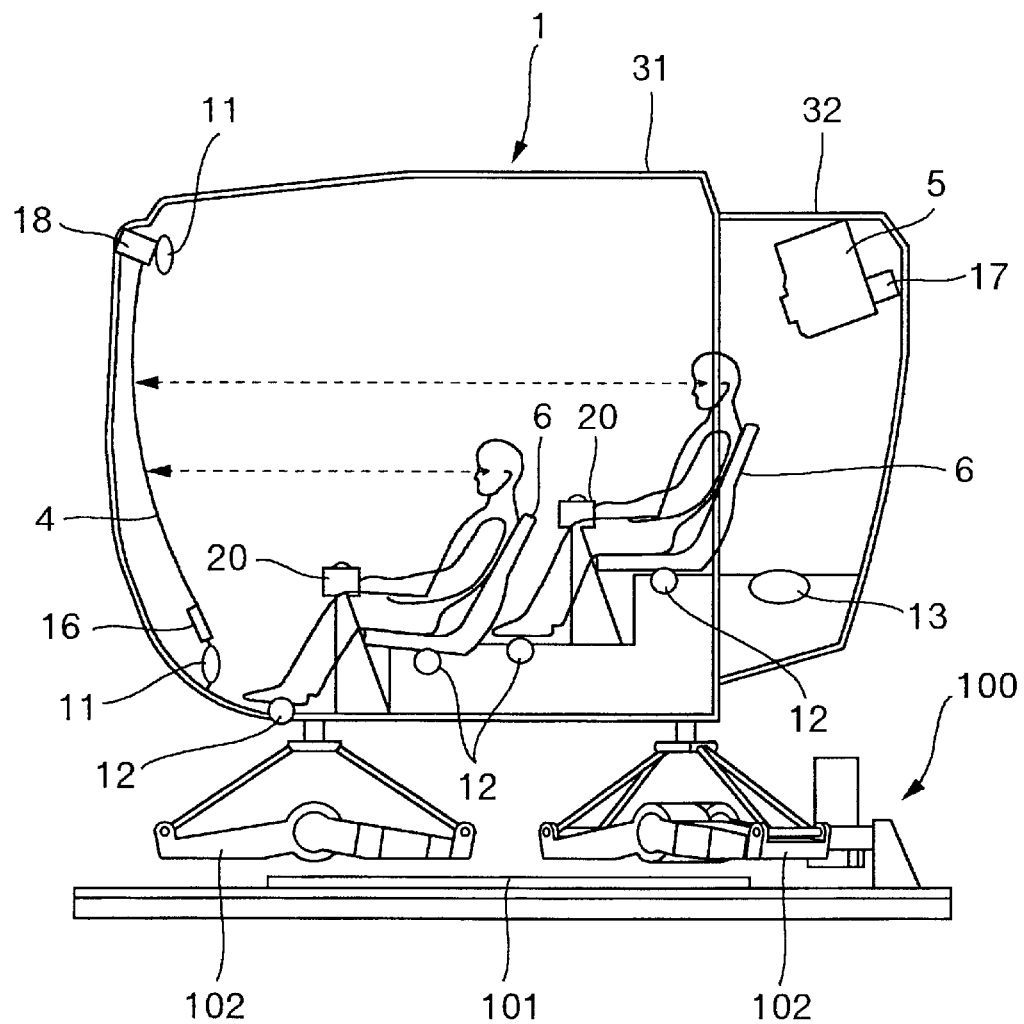
FIG. 2 is an explanatory diagram of a ride simulation system related to an embodiment of the present invention, viewed from the side when a platform is remove.
Figure 3:
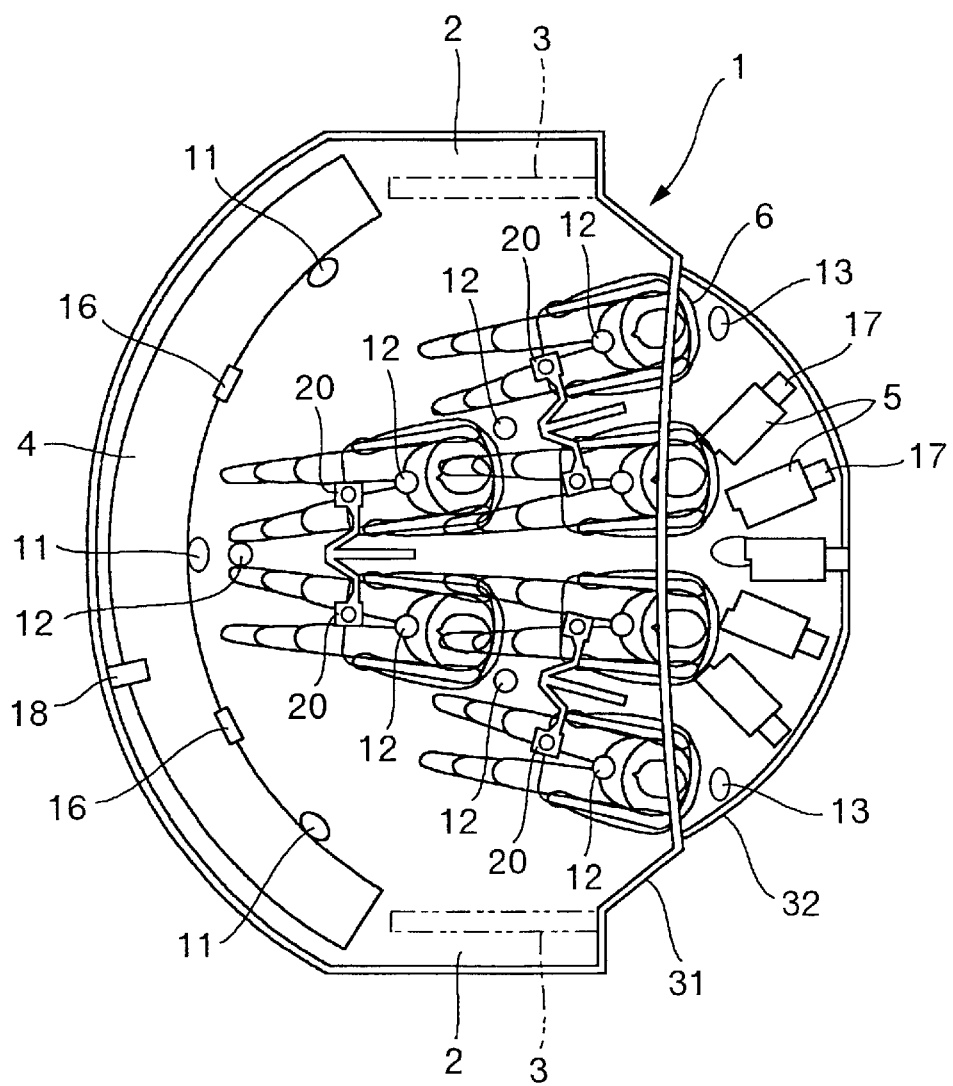
FIG. 3 is an explanatory diagram of a ride simulation system related to an embodiment of the present invention, viewed from the top when a platform is removed.

FIG. 1 is a partially cutaway front view of the general appearance of a ride simulation system related to an embodiment of the present invention. FIG. 2 is an explanatory diagram of the ride simulation system, viewed from the side when a platform is removed. FIG. 3 is an explanatory diagram of the ride simulation system, viewed from the top from when a platform is removed.

As shown in FIG. 1, the ride simulation system of this embodiment is mainly composed of a ride casing 1 which is in shape of a sealed capsule and can take six persons in, a driving mechanism 100 which drives this ride casing 1 and is situated in the low part of this ride casing 1, and a platform 200 which is arranged so as to surround this driving mechanism 100 and has a plane top surface.

As shown in FIG. 3, entrances 2 to the ride casing 1 are provided on both sides of the ride casing 1 and each entrance 2 is provided with a door 3 which works by sliding. The doors 3 are closed, so that the space within the ride casing 1 is an enclosed space isolated from the outside. In this embodiment, one entrance is dedicated to the comings of crews and the other entrance is dedicated to the goings of crews, then the comings and goings to and from the ride casing 1 are performed in prescribed positions of the platform 200.

The platform 200 is installed to secure safety by surrounding the periphery of the driving mechanism 100, to produce a good appearance, and to ensure the comings and goings at the entrances 2 which is located at a prescribed height of the ride casing 1. In this embodiment, the lower periphery of the ride casing 1 is made smaller than the upper periphery thereof, therefore, a gap 202 is generated, as shown in FIG. 1, between the lower part of the ride casing 1 and the top surface 201 of the platform 200 (this gap 202 is provided to meet design requirements for a good appearance of the ride casing 1 and to avoid a collision with the platform 200 during the operation of the ride casing 1). Incidentally, adjacent to the platform 200 there are provided staircases 204 for the ascents and descents to and from the top surface 201 of the platform. One staircase is dedicated to the comings of crews and the other staircase is dedicated to the goings of crews.

In case the gap 202 is present between the lower part of the ride casing 1 and the top surface 201 of the platform 200 as mentioned above, people who come to and go from the ride casing 1 or people waiting on the platform 200 to have a next ride are in danger of falling in the gap 202 due to carelessness, etc. In this embodiment, therefore, between the entrance 2 of the ride casing 1 and a position opposed to the entrance 2 on the platform 201, there is provided a fall-preventing plate 203 which is capable of assuming a vertical position for preventing the comings to and goings from the entrance 2 and a lying position that allows the comings to and goings from the entrance 2. (In FIG. 1, the fall-preventing plate 203 is drawn only on the side of one entrance 2. In fact, however, the fall-preventing plate 203 is provided on the sides of both entrances 2.) Incidentally, on the top surface 201 of the platform 200 other than the places where the fall-preventing plate 203 is installed, fall-preventing fences, etc., may be installed as required or the passages for entry and leaving may be partitioned by handrails, fences, etc.

The above fall-preventing plate 203 is installed on the platform 201 so as to be rotatable 90°. When the fall-preventing plate 203 assumes a vertical position, it prevents people from falling the gap 202 between the above entrance 2 and the platform 200. When the fall-preventing plate 203 assumes a lying position, it blocks the gap 202 between the above entrance 2 and the platform 200 and, at the same time, serves as a step which connects the floor surface of the above entrance 2 with the top surface 201 of the platform 200.

By installing this fall-preventing plate 203 which serves as both an entry-preventing member and a step member, it is possible to secure safety by preventing entries, to ensure the ease and safety during the comings and goings, and besides to reduce the number of parts.

The above driving mechanism shown in FIGS. 1 and 2 is composed of a sliding member 101 slidable forward and backward (in the direction crossing at right angles with the surface of the paper in FIG. 1 and horizontally in FIG. 2), three lifting means 102 arranged on this sliding member 101 and connected to the lower part of the ride casing 1, and driving sources for those. The three lifting means 102 are disposed in such a way that two of them are provided on the front side and one of them is provided on the back side, and they can perform hoisting and lowering motions independently from each other. In this embodiment, therefore, the ride casing 1 is capable of the motion of forward and backward sliding, the hoisting and lowering motions, and the motion of tilting (oscillation) in any direction.

As shown in FIGS. 2 and 3, on the front surface of the interior of the ride casing 1, there is provided a round curve screen 4 (hereinafter referred to as a screen) which has the shape of an arc both in the longitudinal section and in the cross section and is horizontally long. Furthermore, in the upper part of the back of the interior of the ride casing 1, there are provided a plurality of projectors 5 (five projectors in this embodiment). Each of the projectors 5 performs projection on to the respective divided areas of screen 4 allocated to them (for example, the projector 5 in the lowest position in FIG. 3 performs projection on the divided area in the highest position of the screen 4) so that one picture is displayed through image formation on the screen 4 by the five projectors 4.

Because one picture is formed on the screen 4 by means of the five projectors 5 as mentioned above, distortion-free and high-precision images can be formed in spite of the screen 4 formed the round curve shape and besides images which give a three-dimensional appearance can be displayed, thereby contributing greatly to creating imaginary and virtual environment spaces (virtual spaces) full of a sense of realism.

In this embodiment, as mentioned above, six persons can ride in the ride casing 1 at a time and, therefore, six seats 6 are provided within the ride casing 1. As shown in FIGS. 2 and 3, the seats 6 are arranged in two rows so that the seats in the front row are lower than those in the back row, wherein two seats are installed in the front row and four seats are installed in the back row. When crews sit on the seats 6, the crews are opposed to the screen 4. Furthermore, the crews are positively held on the seats 6 with holders such as a seat belt in order to secure safety.

As shown in FIG. 3, the above seats in the two rows of the front and back are arranged so that they describe a gentle arc in each row in order to ensure that the eyes of the crews are easily directed to near the center in the horizontal direction of the screen 4. Furthermore, in this embodiment, the center line of the seats 6 in the front row are turned 5° to 10° with respect to the horizontal line passing the center of the screen 4 on the drawing, as shown in FIG. 3, and the centerline of the seats 6 in the back row are turned 5° to 30°. Furthermore, as shown in FIG. 2, the positional relationship between the screen 4 and the seats 6 is set so that the eyes of the crews sitting in the seats 6 in each row are directed to almost the center level of the screen 4 in the vertical direction. This arrangement of the seats enables all crews of the ride casing 1 to see the center part of a picture with good visibility.

Figure 4:
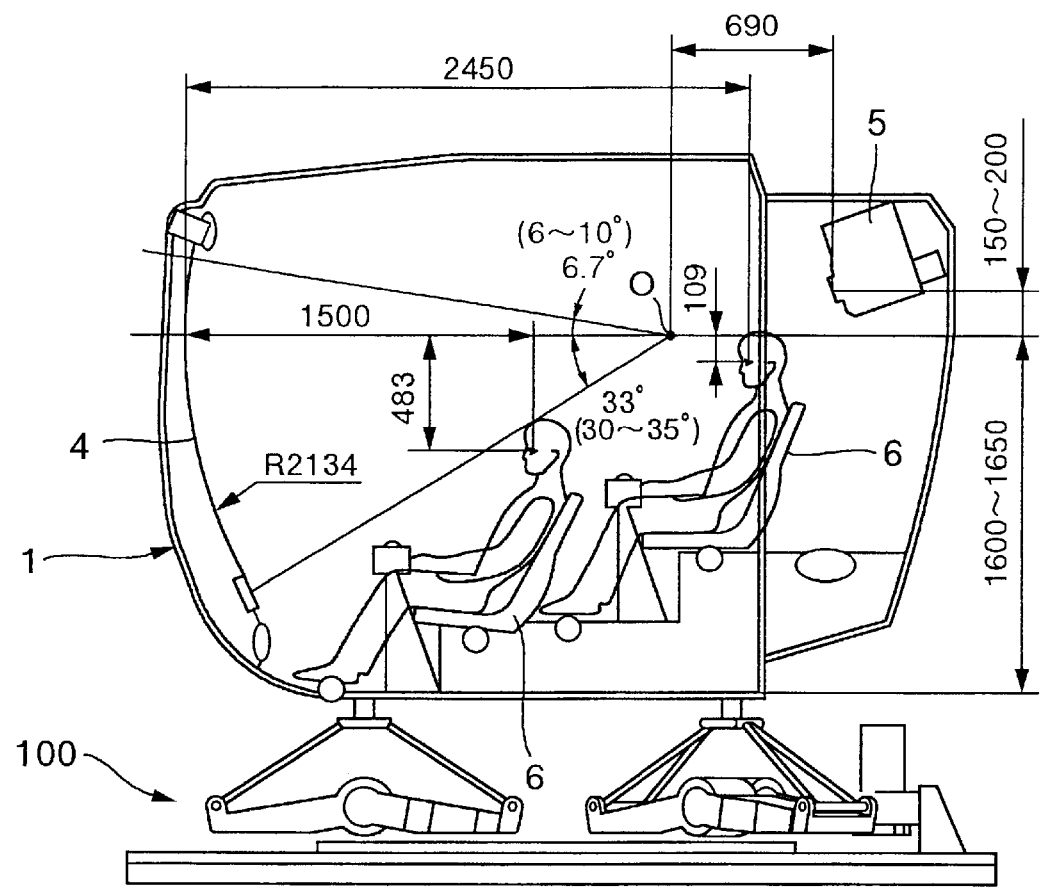
FIG. 4 is an explanatory diagram which corresponds to FIG. 2 and shows the dimensions of prescribed portions and the angle of a screen viewed from the side.
Figure 5:
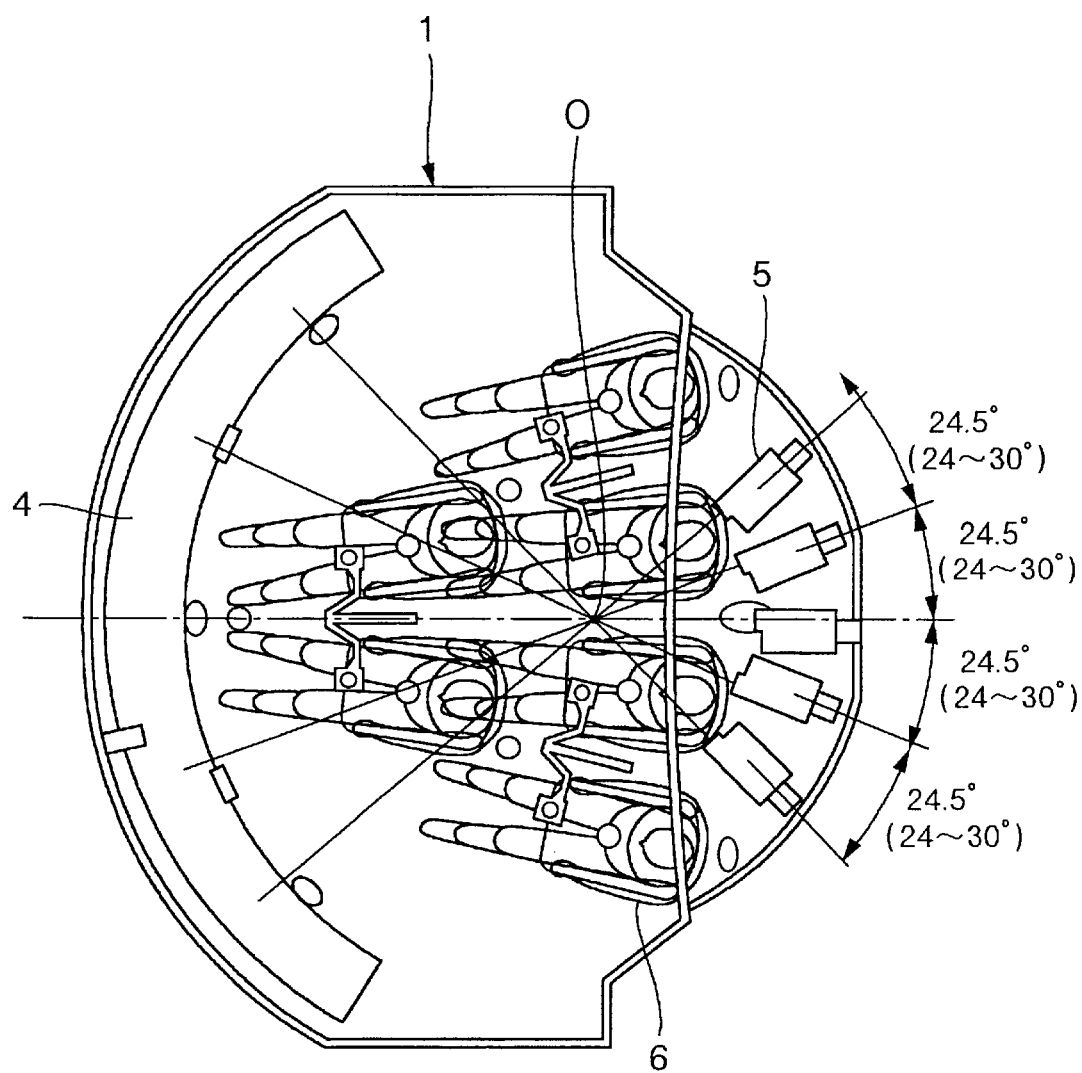
FIG. 5 is an explanatory diagram which corresponds to FIG. 3 and shows the relation of the angle of optical axis of each projector to the screen viewed from the top.

FIG. 4 corresponds to FIG. 2 and FIG. 5 corresponds to FIG. 3. In FIG. 4, the dimensions of prescribed portions and the angle of the screen 4 when the ride casing 1 is viewed from the side are shown for reference. In FIG. 5, the relation of the optical axis of each projector 5 to the screen 4 viewed from the top of the ride casing 1 is shown for reference. Incidentally, in FIGS. 4 and 5, the mark O indicates a point of intersection of optical axes of the projectors 5 and some of the numerical values in the figures indicate its range of variation.

In this embodiment, a large number of speakers are disposed within the ride casing 1. More specifically, as shown in FIGS. 2 and 3, mid-range and high-range speakers are mainly disposed in the upper and lower parts of the screen 4 and, under the cushion of each seat 6, there are disposed low-range speakers 12 (woofers) for body sonic purpose separately for each seat. Furthermore, under the base portions of the seats 6 midway between a pair of seats 6 and 6, there is disposed a low-range speaker 12 (woofer) for body sonic purpose, which is used for both seats in pair. In addition, in the floor of the innermost part of the ride casing 1, there is disposed a pair of right and left low-range speakers 13 (sub-woofers).

This arrangement of the speakers enables the crews of the ride casing 1 to feel virtual spaces full of a sense of realism owing to the sounds from many directions and vibrations (bodily sensation) from the portions at their feet and from the portion under the cushions by the speakers 12 and 13 and as a result it is easy for the crews to be absorbed in the virtual spaces.

Incidentally, speakers may also be disposed in the upper part of the rear of the ride casing 1 or on the right and left sides of the ride casing 1. In such cases, it is possible to further raise a sense of realism.

Furthermore, because this effect of a sense of realism by the speakers and the above effect of a sense of realism of images by the round curve screen 4 and five projectors 5 go hand in hand, it is possible to produce imaginary and virtual environment spaces (virtual spaces) having more of a sense of realism.

As shown in FIGS. 2 and 3, fans 16 for ventilating the interior of the ride casing 1 are provided at the lower front part of the interior of the ride casing 1 and fan 17 for cooling the projector 5 is provided at the upper rear part of the ride casing 1 for each projector 5. Furthermore, at the upper front part of the interior of the ride casing 1, there is provided a monitoring camera 18 for watching the interior of the ride casing from the outside so that whether the crews are in a safe condition can always be easily ascertained from the outside.

In this embodiment, as shown in FIGS. 2 and 3, two operation devices 20 which the crews sitting on the seats can shift from the waiting aisle position to the operating position are provided between a pair of seats 6 and 6 within the ride casing 1. More specifically, there are provided the operation devices 20 which all crews sitting on the seats 6 can individually operate.

Figure 6:
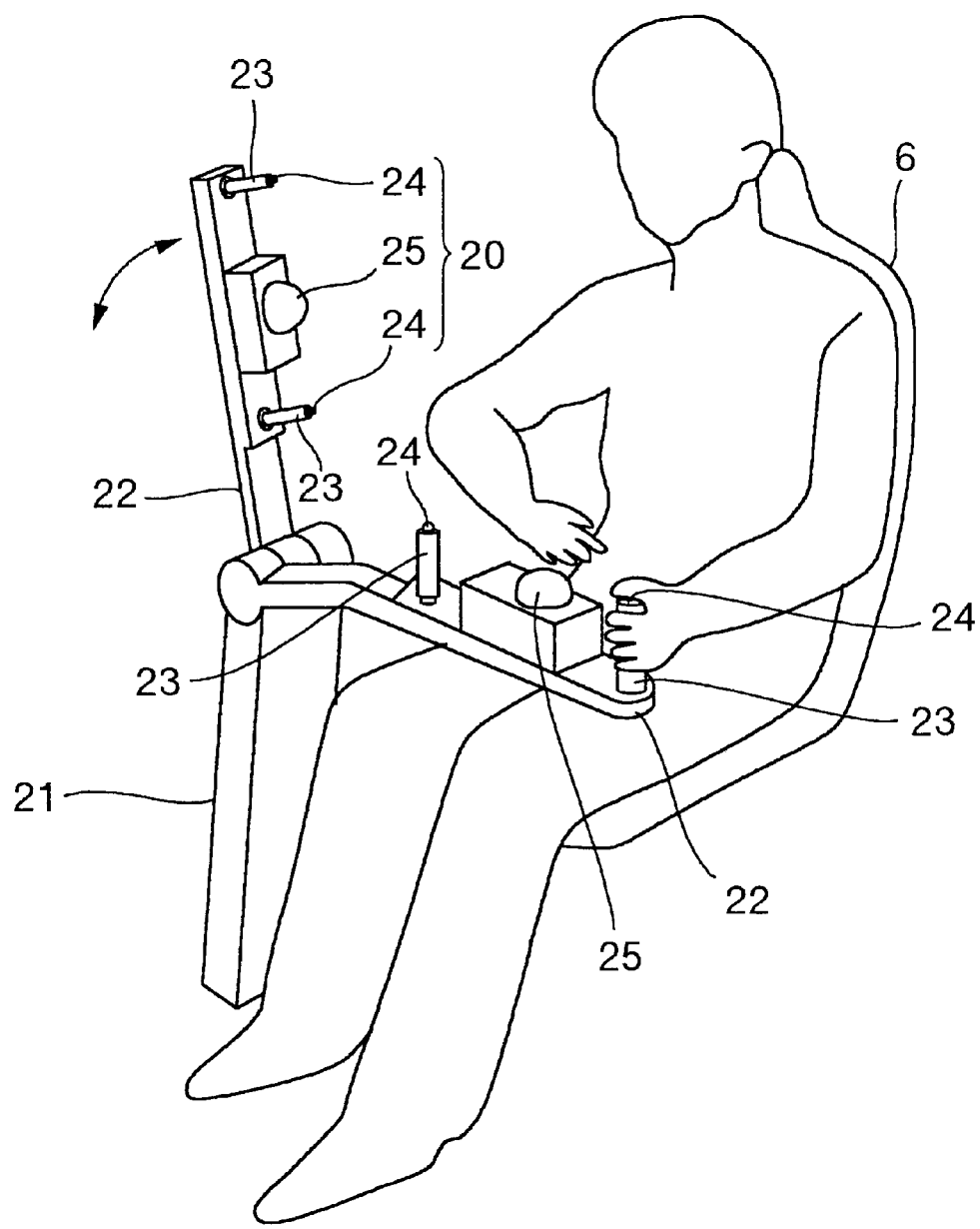
FIG. 6 is an explanatory diagram of the operating condition of an operation device regarding a ride simulation system related to an embodiment of the present invention.

FIG. 6 shows that the crew sitting on the seat 6 is operating the above operation device 20. As shown in FIG. 6, a holding member 21 is set upright between the pair of seats 6 and 6 and a pair of bar-like members 22 are attached to the holding member 21 in rotatable condition through about 90°. The bar-like member 22 can be rotated by the crew's operation from the vertical position of the side of the seat 6 and brought into a lying condition in a position near above the lap of the crew sitting on the corresponding seat 6. In the two operation positions of the device, the bar-like member 22 is kept in the positions by a locking mechanism, which is not shown in the figure.

When the bar-like member 22 is lying in the position near above the crew's lap so that it crosses above the crew's lap, the operation device 20 installed in the bar-like member 22 is positioned so that the crew can operate the operation device 20. In this embodiment, the operation device 20 is composed of switches 24 installed on the tops of a pair of grip parts 23 which stand upright from the bar-like member 22 and a trackball 25 installed on the bar-like member 22 in the intermediate position of the pair of grip parts 23.

In the operation of the operation device 20, this construction of the operation device 20 enables the crew to operate the switches 24 while stabilizing the crew's own hand and fingers owing to grasp the grip part 23 with the hand. Furthermore, the crew can operate the trackball 25 with one hand while grasping one grip part with the other hand. Incidentally, in this embodiment, the crew is held to the seat 6 with a seat belt, as mentioned above.

In this embodiment, thus, by the combination of the operations of the two switches 24 and the trackball 25, it is possible to perform diverse and complex operations. Furthermore, because the crew can operate while grasping the grip part 23 with the hand, therefore, the crew can perform operations in a stable manner within the ride casing 1 which is moving. In addition, by operating the trackball 25 in all directions (forward and backward, rightward and leftward and diagonal direction) in response to the contents of the pictures displayed on the screen 4 while the ride casing 1 is moving according to the motions of the pictures, the crew can be immersed in operations and the contents of pictures. Therefore, this can contribute greatly to creating a virtual environment full of a sense of realism and an immersive sense.

Incidentally, it is needless to say that in this embodiment, the ride simulation system has an interactive function so that the contents of the picture change according to the nature of the operation and, at the same time, the ride casing 1 moves by means of operation of the operation device according to the contents of a picture displayed on the screen 4.

Next, the appearance of the ride casing 1 of this embodiment will be described. As shown in FIG. 2, etc., the ride casing 1 is fabricated by combining a front side casing 31 and a back side casing 32 and the periphery of the back side casing 32 is made smaller than that of the front side casing 31 at its junction of the front side casing 31 and the back side casing 32. Furthermore, the color of the external surface of front side casing 31 is different from that of the external surface of back side casing 32. The color of the former is light and that of the latter is dark. The ride casing 1 has a laterally long shape as viewed from the side and the area split ratio of the front side casing 31 to the back side casing 32 as viewed from the side is set at from 8:2 to 6:4

This construction of the ride casing 1 can give the impression that the ride casing 1 is a frisky and small-sized one. FIG. 7 shows the result of a survey by a questionnaire to many people as to which ellipse looks to have the smallest surface area regarding the split ratios of white and black portions in case that the ellipses are colored white and black. As shown in FIG. 7, the result is obtained that the surface area of an ellipse looks to be smallest in case that the white-black split ratio of the ellipse is 7:3 and that the surface area of an ellipse looks to be small to many people when the white-black split ratio of the ellipse is in the range of from 8:2 to 6:4. On the basis of this result of the questionnaire, the area split ratio of the front side casing 31 to the back side casing 32 as viewed from the side is set at from 8:2 to 6:4 in this embodiment.

Figure 8:
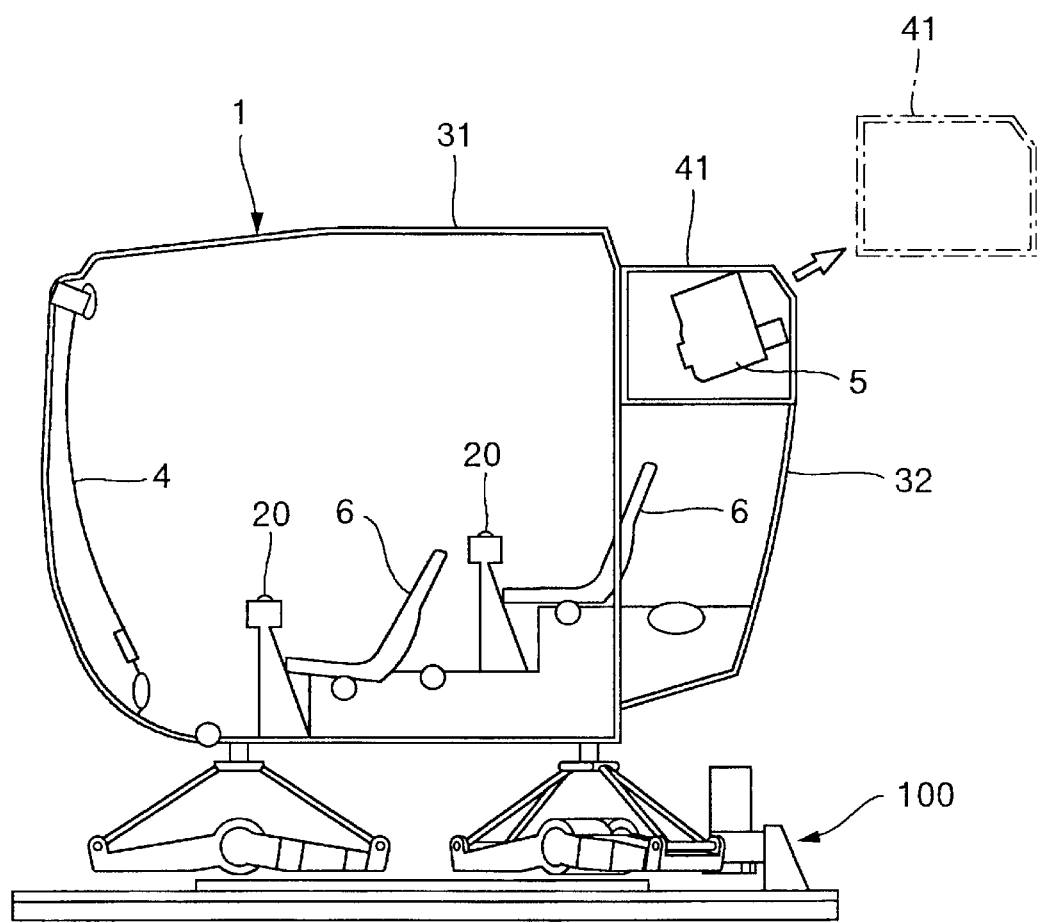
FIG. 8 is an explanatory diagram of a ride simulation system related to an embodiment of the present invention from which a projector housing is removed.

In this embodiment, as shown in FIG. 8, a housing 41 for each projector 5 is installed in the upper part of the back side casing 32 so that the housing 41 can be independently removed outward from the ride casing 1. This enables the projectors 5 to be easily inspected, repaired and replaced individually during maintenance, etc.

Next, other examples of operation devices are explained, in which all crews sitting on each seat 6 can individually operate operation devices.

Figure 9:
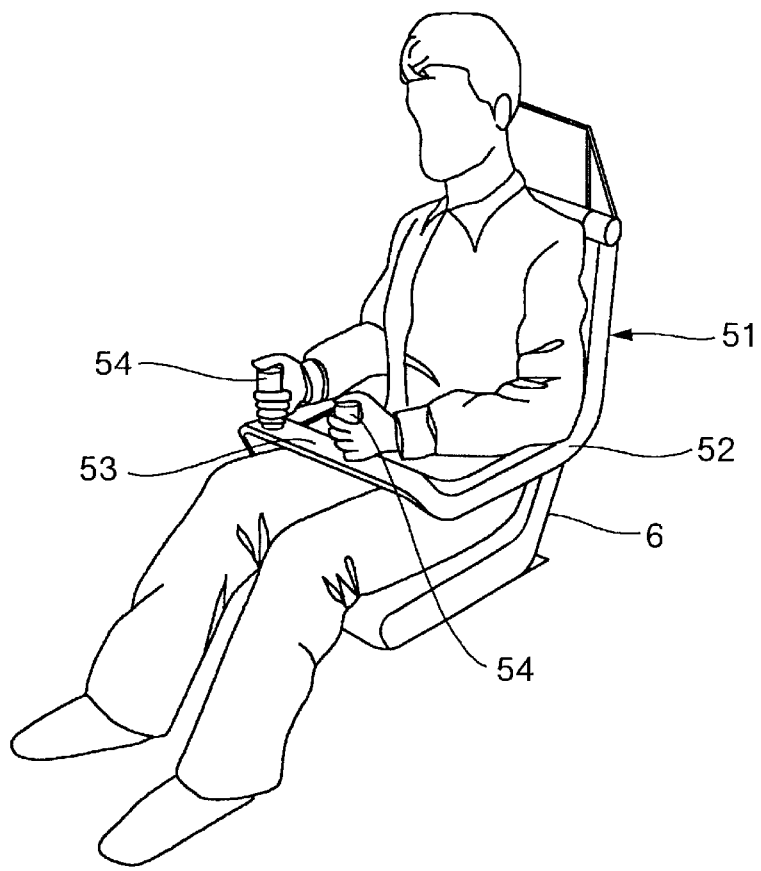
FIG. 9 is an explanatory diagram of a further example 1 of an operation device that can be applied in a ride simulation system related to an embodiment of the present invention.
Figure 10:
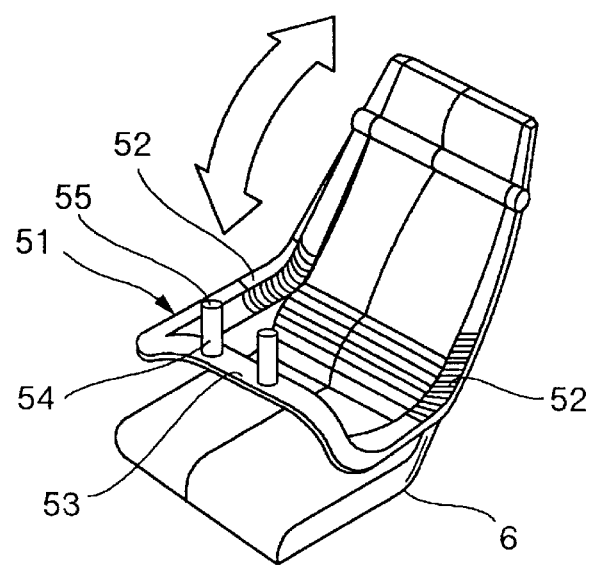
FIG. 10 is an explanatory diagram of a further example 1 of an operation device that can be applied in a ride simulation system related to an embodiment of the present invention.

FIGS. 9 and 10 show further example 1 of operation device that can be applied in the ride simulation system of this embodiment.

In FIGS. 9 and 10, the numeral 51 indicates a frame member rotatably attached to the upper part of the back of the seat 6 and this frame member 51 can rotate between prescribed portions using the upper part of the seat back as the axis of rotation, as indicated by the arrow in FIG. 10. This frame member 51 is a member for holding the body of the crew sitting on the seat 6. As shown in FIG. 9, there are provided two arm rest portions 52 and 52, which carry the two arms of the crew sitting on the seat when the frame member 51 is in a lowered position for holding the crew's body, and a lateral bar portion 53, which extends almost horizontally and connects to the two arm rest portions 52 and is positioned near above the lap of the crew when the frame member 51 is in a lowered position. A pair of joysticks 54 and 54 are disposed upright on the lateral bar 53 as operation devices and switches 55 are also installed on tops of the joy sticks 54 as operation devices.

In the example of the above construction, the crew can operate the joysticks 54 and switches 55 with the crew's body held by the frame member 51 and the crew's arms fixed by the arm rest portions 52, improving operability and enabling elaborate control operations to be easily performed.

Figure 11:
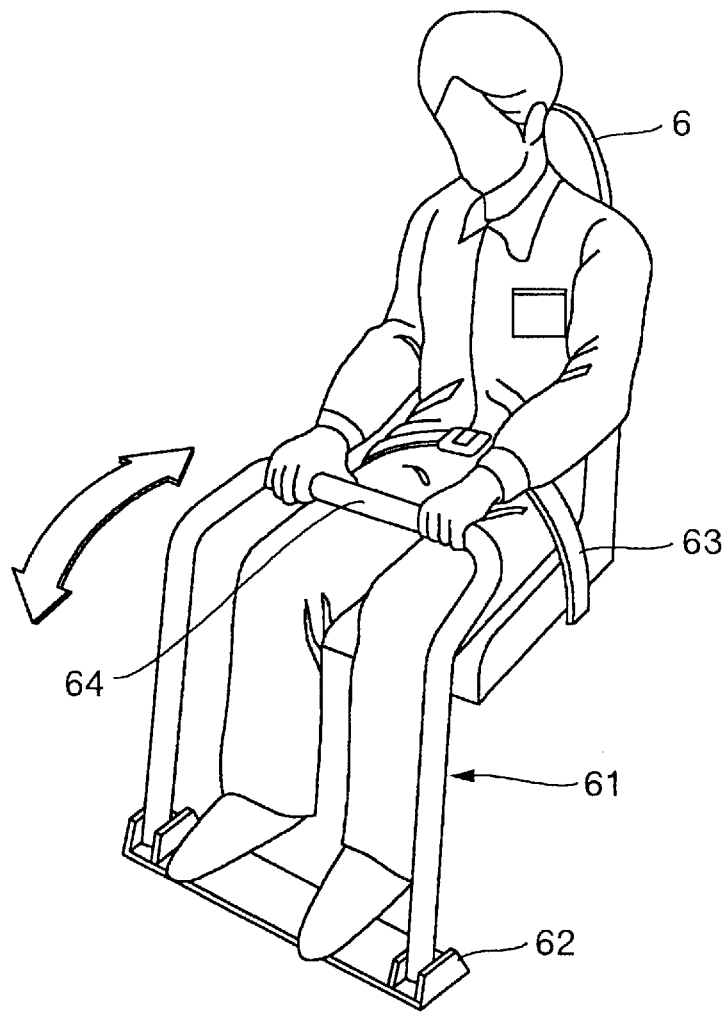
FIG. 11 is an explanatory diagram of another example 2 of an operation device that can be applied in a ride simulation system related to an embodiment of the present invention.
Figure 12:
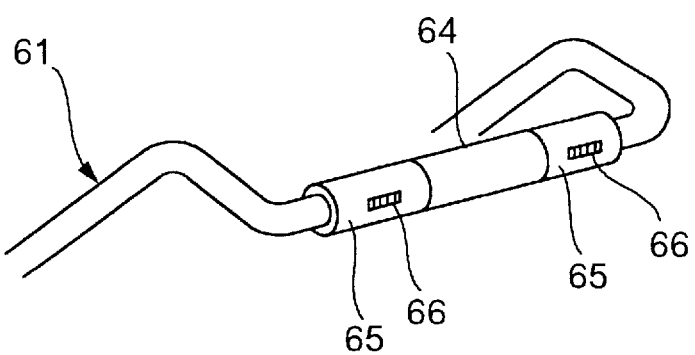
FIG. 12 is an explanatory diagram of another example 2 of an operation device that can be applied in a ride simulation system related to an embodiment of the present invention.

FIGS. 11 and 12 show another example 2 of operation device that can be applied in the ride simulation system of this embodiment.

In FIG. 11, the numeral 61 indicates a frame member which is installed so that it can be pulled up from the base portion of the seat 6 and this frame member 61 can rotate between prescribed portions using the portion supported by a holder 62 as the axis of rotation, as indicated by the arrow in FIG. 11. This frame member 61 is a holding member which functions as a member for stabilizing the positions of the crew's hands when the crew is held on the seat with a seat belt 63 for holding the body of the crew sitting in the seat 6. As shown in FIG. 11, this frame member 61 is provided with a lateral bar portion 64, which becomes situated near above the lap of the crew sitting in the seat when the frame member 61 is in a pulled up position. As shown in FIG. 12, the lateral bar portion 64 is provided with grip portions which the crew can grasp parts with the hands and switches 66 as operation devices.

In this example of the above construction also, it is possible to operate the operation devices in a stable manner and with good operability.

Figure 13:
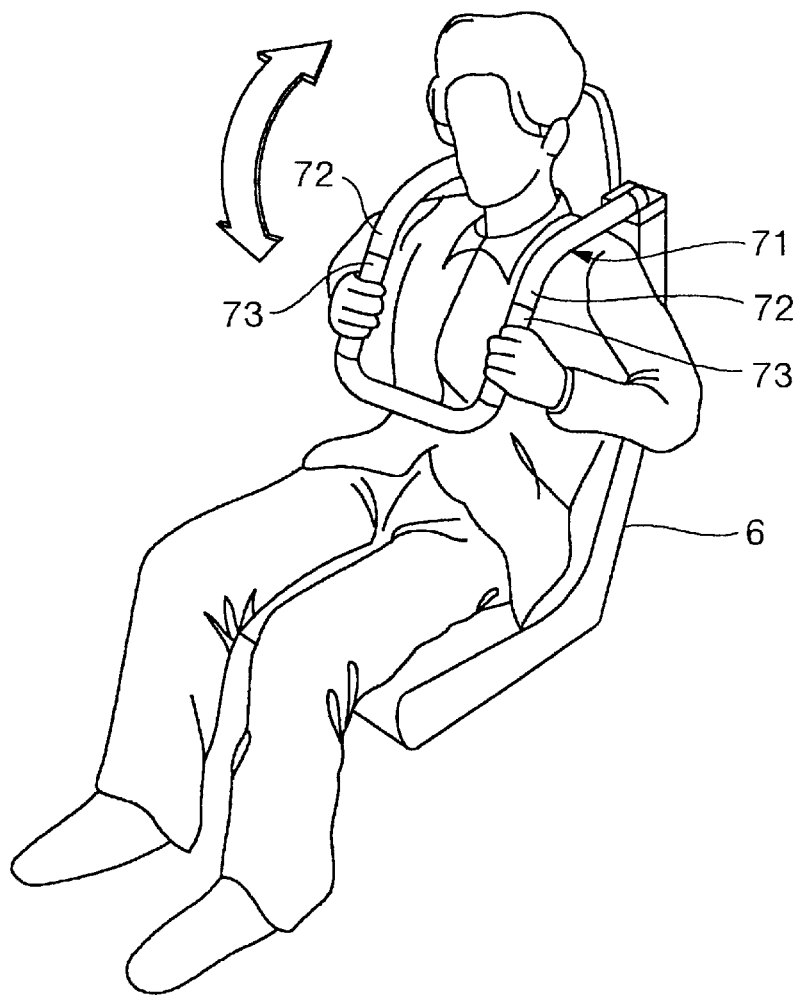
FIG. 13 is an explanatory diagram of another example 3 of an operation device that can be applied in a ride simulation system related to an embodiment of the present invention.
Figure 14:
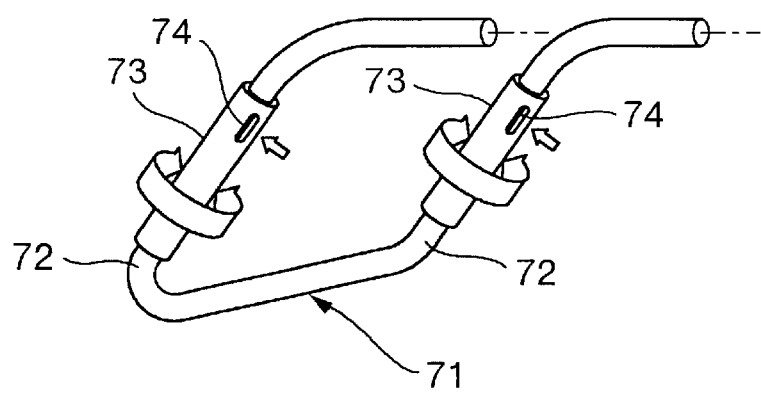
FIG. 14 is an explanatory diagram of another example 3 of an operation device that can be applied in a ride simulation system related to an embodiment of the present invention.

FIGS. 13 and 14 show another example 3 of operation device which can be applied in the ride simulation system of this embodiment.

In FIG. 13, the numeral 71 indicates a frame member rotatably attached to the upper part of the back of the seat 6 and this frame member 71 can rotate between prescribed positions using the upper part of the seat back as the axis of rotation as indicated by the arrow in FIG. 13. This frame member 71 is a member for holding the body of the crew sitting on the seat 6 (a member for holding the shoulders). As shown in FIG. 13, when the frame member 71 holds the crew's body and is in a lowered position, the crew can grasp grip portions 73 installed between a pair of right and left bar-like portions 72. As shown in FIG. 14, switches 74 as operation devices are provided in the grip portions 73 and the grip portions 73 are adapted to be rotatable, and devices for converting this rotary operation into electrical signals, for example, volumes are further installed as operation devices.

In this example of the above construction also, it is possible to operate the operation devices in a stable manner and with good operability.

Figure 15:
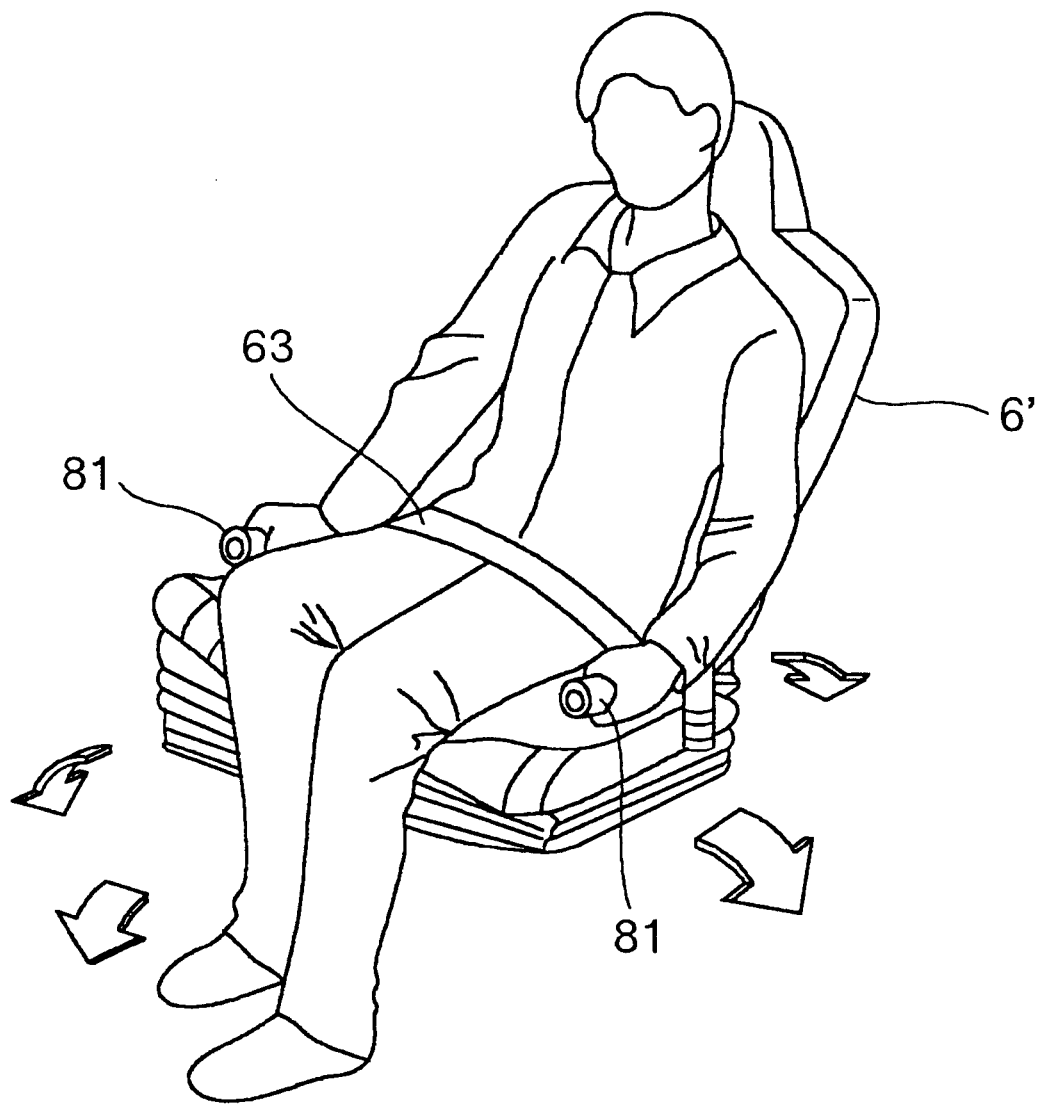
FIG. 15 is an explanatory diagram of another example 4 of an operation device that can be applied in a ride simulation system related to an embodiment of the present invention.

FIG. 15 shows another example 4 of operation device which can be applied in the ride simulation system of this embodiment.

In this example, a seat 6' is formed so that it can tilt in many directions by means of a sheet driving mechanism, which is not shown in the figure. In the right and left portions of this seat 6', there are provided lever-like operation members 81 which the crew sitting on the seat 6' can grasp with the right and left hands. When the crew held on the seat 6' with a seat belt appropriately operates the operation members 81, which are composed of, for example, joysticks and switches, the crew can move the seat 6' at will and can also perform operations other than the driving of the seat 6' in an interactive manner with the pictures on the screen.

In this example of the above construction, it is possible to simultaneously obtain the motions of the ride casing 1 and the individual motion for each crew. Thus, a ride simulation system with diverse variations in motion can be realized.

Next, another embodiment related to a ride casing and internal structure are described.

Figure 16:
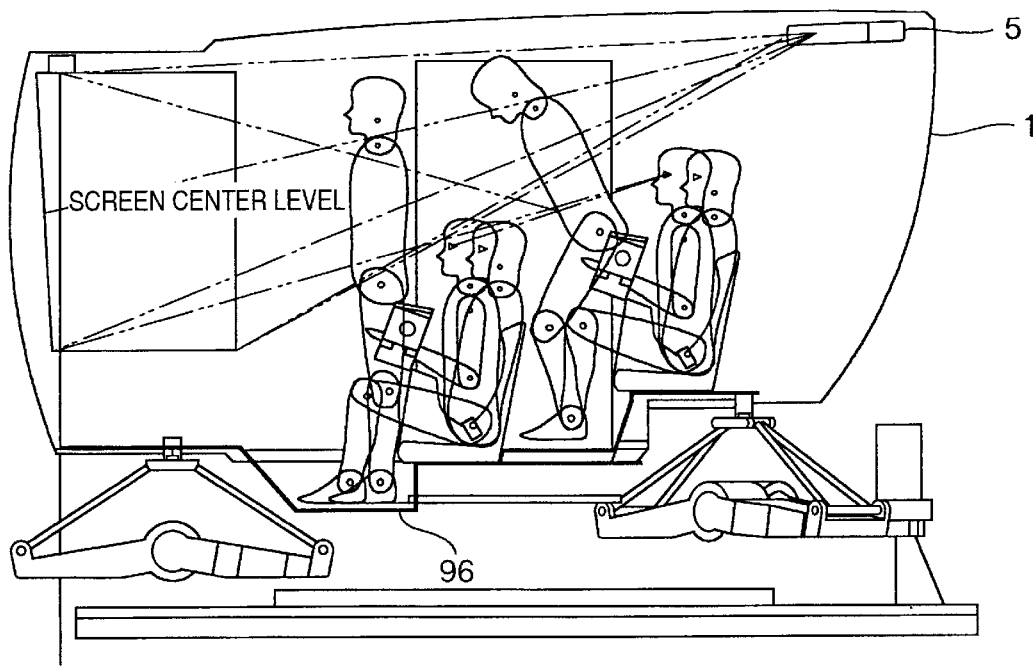
FIG. 16 is an explanatory diagram of a ride simulation system related to an embodiment of the present invention, viewed from the side when a platform is removed.
Figure 17:
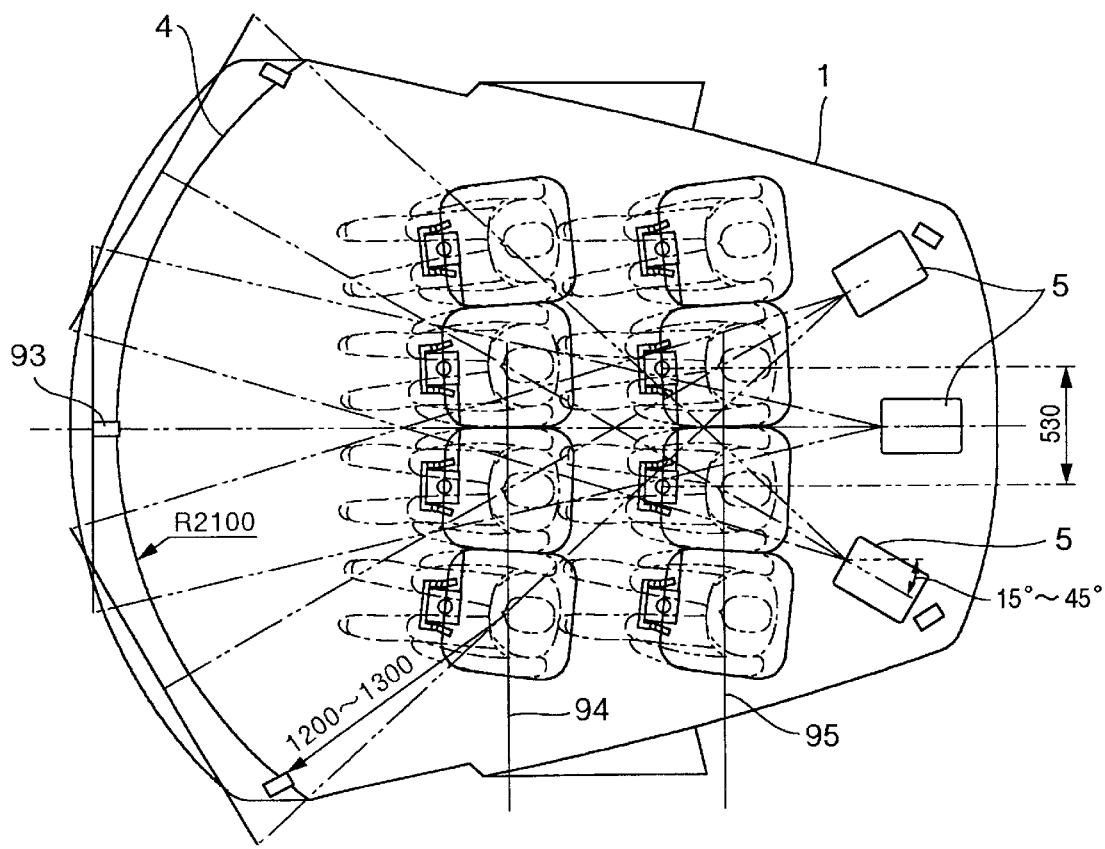
FIG. 17 is an explanatory diagram of a ride simulation system related to an embodiment of the present invention, viewed from the top when a platform is removed.
Figure 18:
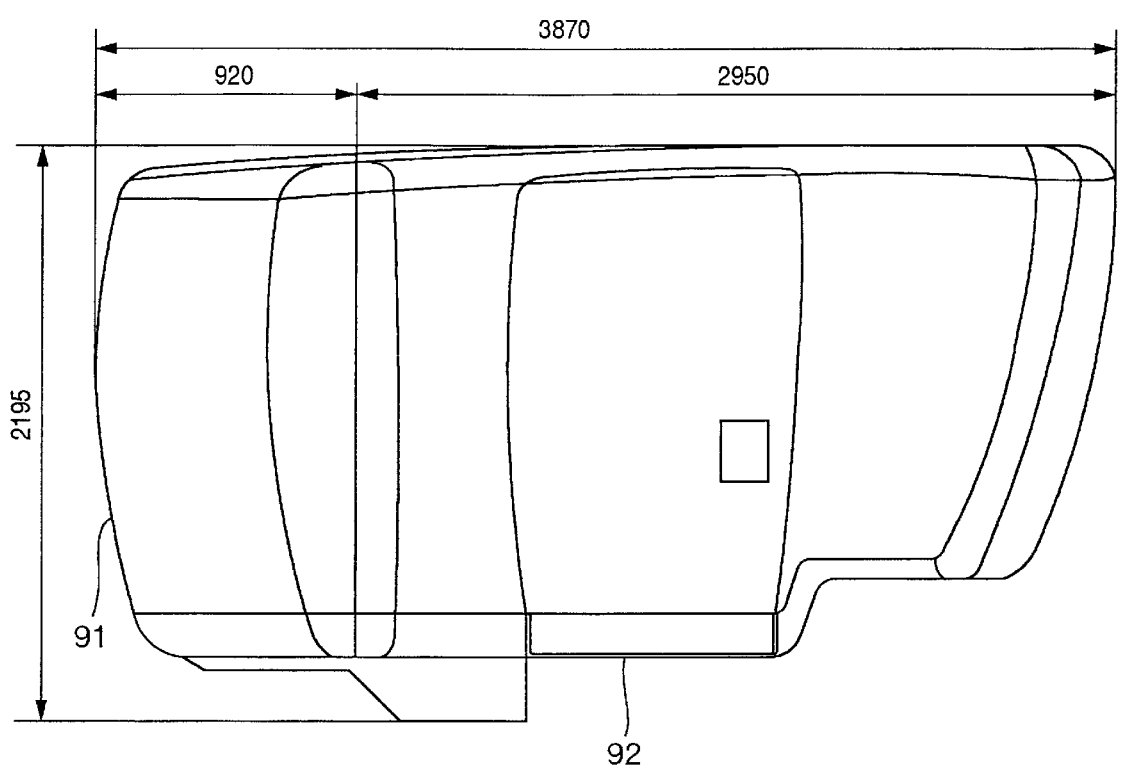
FIG. 18 is a side view of the appearance of a ride simulation system related to an embodiment of the present invention, when a platform is removed.
Figure 19:
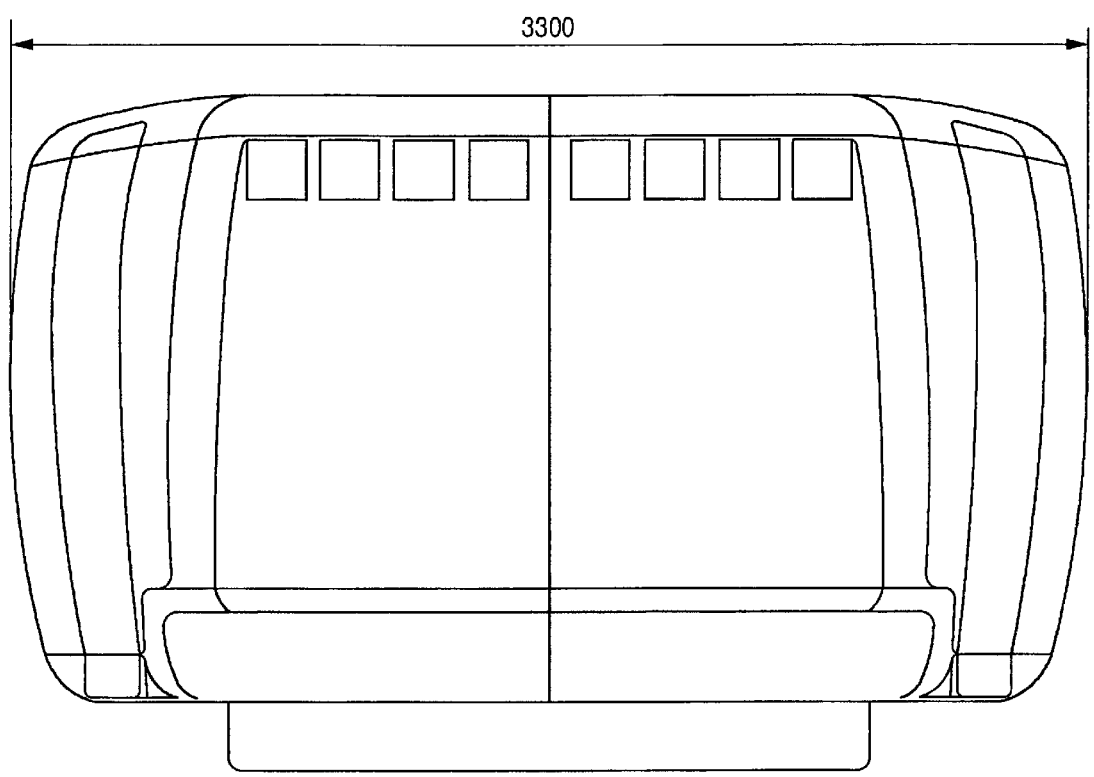
FIG. 19 is a rear view of the appearance of a ride simulation system related to an embodiment of the present invention, when a platform is removed.

FIG. 16 shows an example of dimensions of prescribed portions and an angle of the screen 4 when the ride casing 1 is viewed from the side. FIG. 17 shows an example of the relation of an optical axis of each projector 5 to the screen 4 viewed from the top surface of the ride casing 1. The components in these figures corresponding to the previous drawings are given like reference characters. FIG. 18 shows the appearance of the ride simulation system, viewed from the side when a platform is removed. FIG. 19 shows the appearance the ride simulation system, viewed from the rear when a platform is removed.

Appropriate sizes of the ride casing 1 are such that the width is from 3300 to 3600 mm as in an example shown in FIG. 19, the height is about 2195 mm as in an example shown in FIG. 18 and the depth is about 3870 mm as in an example shown in FIG. 18. In this embodiment, the ride casing is composed of a front screen part 91 (3300 mm wide, 1872 mm high, 920 mm deep) and a back part 92. As shown in FIG. 19, the back part is further divided at the center into two parts. The divided parts are 1650 mm in width, 1872 mm in height and 2950 mm in depth. In this case that the ride casing is divided into three parts, each part has a size that enables the part to be carried into a lift for business use.

Appropriate sizes of the screen 4 are such that, as minimum dimensions for producing an immersive sense for the crew, the width is from 3300 to 3600 mm and the height is from 1200 to 1500 mm. Furthermore, as shown in FIG. 17, the screen is curved in an arc form with a radius of 2100 mm and its angle is about 120 degrees. These curve and angle are also effective in producing an immersive sense.

As shown in FIG. 17, four front seats and four back seats, i.e., a total of eight seats are installed as the seats on which crews sit. The distance from the center 93 of the screen to the center 94 of the front seats is 1670 mm and the distance from the center 93 of the screen to the center 95 of the back seats is 2570 mm. The distance from the eyes of the crew sitting on the outside seat in the front row to the end of the screen is 1200 to 1300 mm. The two inside seats in the front row and two inside seats in the back row are arranged to generate a rotational angle of 2° to the direction of the center in width of the screen. The two outside seats in the front row and two outside seats in the back row are arranged to generate a rotational angle of 6° to the direction of the center in width of the screen. These distances and angles are effective in producing an immersive sense.

The sizes of the seats are such that the total width including arm rests is not less than 530 mm, the width of the cushion is not less than 430 mm, the depth of the cushion is not less than 430 mm, and the center-to-center distances of the seats is not less than 530 mm. This arrangement and size of the seats on which crew sit enable eight persons to ride, enable the operation devices such as trackballs and joysticks to be easily operated, and enable spaces for crews to get on and off smoothly to be secured.

As shown in FIG. 16, the height of the projector is about 2100 mm from the bottom surface of the ride casing 96. In a case where three projectors are mounted in the horizontal direction, the distance between the two right and left projectors is 1400 to 1800 mm and the horizontal angle of the two right and left projectors is 15° to 45° toward the center of the screen. Furthermore, the vertical angle of the projectors 5 is about 0° to 7° downward.

Seats and projectors 5 are arranged so that the images projected from the projectors 4 arranged behind the seats are not intercepted by the heads of the crews sitting on the front seats (the crews are supposed to be 1860 mm tall) and the screen can also be sufficiently seen by the crews sitting on the back seats.

This construction enables the ride casing to be easily transported and carried in and can increase the number of seats relative to the area occupied by the ride simulation system. Furthermore, this construction enables spaces for crews to get on and off smoothly and spaces for smooth operations of the operation devices to be secured and can also produce an immersive sense.

In the above embodiments, examples of ride casings for six and eight persons were described. It is needless to say, however, that an arbitrary number of crews can ride in the ride casing.

As is apparent from the foregoing, in the invention related to claim 1, distortion-free and high-precision precision images can be presented for many crews and besides images which give a three-dimensional appearance can be displayed, thereby making it possible to creating virtual spaces full of a sense of realism.

Furthermore, in the invention related to claim 5, the crews can feel virtual spaces full of a sense of realism owing to the sounds from many directions and vibrations (bodily sensation) from the portions at their feet and from the portion under their cushions.

Furthermore, in the invention related to claims 6 to 12, the operation devices can be operated in a stable manner and with good operability. Besides, in the invention related to claims 7 and 8, by operating the trackball in response to the contents of the pictures displayed while the ride casing is moving according to the motions of the pictures, the crew can be immersed in operations and the contents of pictures. Therefore, this can contribute greatly to creating a virtual environment full of a sense of realism and an immersive sense.

Moreover, in the invention related to claim 13, it is possible to simultaneously obtain the motions of the ride casing and individual motion for each crew. Thus, the ride simulation system with diverse variations in motion can be realized.

Besides, in the invention related to claim 15, it is possible to give the impression that the ride casing is a frisky and small-sized one.

Besides, in the invention related to claim 17, the projectors can be easily inspected, repaired and replaced individually at the maintenance, etc.

Furthermore, in the invention related to claim 18, it is possible to secure safety, to ensure the ease of the comings and goings of crews, and besides to reduce the number of parts.

What is claimed is:

1. The ride simulation system comprising a ride casing which is in shape of a capsule and can accept plurality of people, and a driving mechanism for driving the ride casing, wherein a curve screen which is long in width is disposed at the front within the ride casing, a plurality of projectors are disposed at the rear within the ride casing, and the plurality of projectors project on corresponding divided areas of the curve screen so that one picture is displayed on the curve screen, and wherein seats are arranged in a multistage condition within the ride casing so that crews sitting on the seats are opposite to the curve screen and the seats on the front side stage are lower than those on the rear side stage, and the row of the seats on each stage is arranged so as to describe a gentle arc in order to ensure that the eyes of the crews are easily directed to near the center of the curve screen in the horizontal direction wherein each seat is arranged at an angle of from 2° to 6° with the front direction toward the direction of the center in width of the curve screen.

2. The ride simulation system comprising a ride casing which is in shape of a capsule and can accept one or more people, a driving mechanism for driving the ride casing, a display screen which is disposed at the front within the ride casing to display pictures, and seats which are arranged within the ride casing so that crews sitting on the seats are opposite to the display screen wherein an operation device which a crew sitting on the seat can shift from a waiting aisle position to an operating position is provided on or near the seat wherein the operation device is an input device attached to a bar-like member which can be shifted from a side portion of the seat to a position near above the lap of the crew sitting on the seat, and the operation device comprises a pair of grip parts which the crew can grasp with both hands respectively.

3. The ride simulation system according to claim 2, wherein the grip parts stand upright on the bar-like member and switches are provided on the grip parts.

4. The ride simulation system according to claim 2, wherein the operation device comprises a trackball which is provided in the middle of both grip parts on the bar-like member.

5. A ride simulation system comprising a ride casing which is in shape of a capsule and can accept one or more people, a driving mechanism for driving the ride casing, and a display screen which is disposed at the front within the ride casing to display pictures, wherein the ride casing is fabricated by combining a front side casing and a back side casing of which the external surfaces are different in light and darkness or color from each other, the ride casing has a long shape in the lateral direction as viewed from the side, and the area split ratio of the front side casing to the back side casing as viewed from the side is set at 8:2 to 6:4.

6. The ride simulation system according to claim 5, wherein the periphery of the back side casing is made smaller than that of the front side casing at the junction thereof.

7. A ride simulation system comprising:

a ride casing of a capsule-like form, which is capable of accommodating a plurality of human beings therein;

a driving mechanism for driving the ride casing;

a wide curve screen disposed at a front of the ride casing within the ride casing;

a plurality of projectors disposed at a rear of the ride casing within the ride casing for projecting on divided areas on the curve screen, which areas are assigned to the projectors respectively, so that a single image is displayed thereon; and a plurality of seats arranged in a multistage condition within the ride casing so that crews sitting thereon are opposite to the curve screen, the seats disposed on a front side stage being lower than the seats disposed on a rear side stage, each row of the seats on the stages being arranged so as to describe a gentle arc so that crews sitting thereon easily direct their eyes toward the center of the curve screen in a horizontal direction;

wherein the projectors are arranged so as to cross the optical axes thereof at a position in front of the curve screen.

8. The ride simulation system according to claim 7, wherein the seats are disposed, on each stage, so as to incline at from 5 to 30 degrees with respect to a horizontal line passing through a center of the curve screen, so that the crews can easily direct their eyes to a middle position of the curve screen in a vertical direction.

9. The ride simulation system according to claim 7, wherein there are provided operation devices which all the crews sitting on the seats can individually operate.

10. The ride simulation system according to claim 7, further comprising a plurality of speakers disposed at the front within the ride casing, a speaker disposed at the rear within the ride casing, and a speaker disposed anywhere of a portion under a cushion of the seat and/or a portion near a base of the seat for a body sonic purpose.

11. A ride simulation system comprising:

a ride casing of a capsule-like form, which is capable of accommodating a plurality of human beings therein;

a driving mechanism for driving the ride casing;

a wide curve screen disposed at a front of the ride casing within the ride casing;

a plurality of projectors disposed at a rear of the ride casing within the ride casing for projecting on divided areas on the curve screen, which areas are assigned to the projectors respectively, so that a single image is displayed thereon; and a plurality of seats arranged in a multistage condition within the ride casing so that crews sitting thereon are opposite to the curve screen, the seats disposed on a front side stage being lower than the seats disposed on a rear side stage, each row of the seats on the stages being arranged so as to describe a gentle arc so that the crews sitting thereon easily direct their eyes toward the center of the curve screen in a horizontal direction;

wherein the projectors are arranged so as to cross the optical axes thereof at a position in front of the screen; and wherein the ride simulation system further comprises an operation device provided on or near the seat, which can be shifted from a waiting aisle position to an operating position by the crew sitting on the seat.

12. The ride simulation system according to claim 11, wherein the operation device is disposed on a frame member which is rotatably installed in the back of the seat, and the frame member is provided with arm rest portions which carry both arms of the crew sitting on the seat and a mounting portion for the operation device, which is connected to both arm rest portions between them and is adapted to extend almost horizontally and near above the lap of the crew sitting on the seat when the operation device is shifted to the operating position.

13. The ride simulation system according to claim 11, wherein the operation device is disposed on a frame member which is installed so that the frame member can be pulled up from the portion near the base of the seat, the frame member is provided with a lateral bar portion which is adapted to extend near above the lap of the crew sitting on the seat when the operation device is shifted to the operating position, and the lateral bar portion is provided with the operation device comprising grip parts which the crew can grasp with the hands.

14. The ride simulation system according to claim 11, wherein the operation device is disposed on a frame member for holding shoulders, which is rotatably installed in the back of the seat, and by shifting the frame member to a position in which the frame member holds the crew's shoulders, the operation device which is installed in a pair of the grip parts on bar-like portions forming a right side and a left side of the frame member is shifted to the operating position.

15. The ride simulation system according to claim 11, wherein the ride simulation system effects an interactive function such that the image displayed on curve screen varies and the ride casing moves by operating the operation device in accordance with the contents of the image displayed on the curve screen.

16. A ride simulation system comprising:

a ride casing of a capsule-like form, which is capable of accommodating a plurality of human beings therein;

a driving mechanism for driving the ride casing;

a wide curve screen disposed at a front of the ride casing within the ride casing;

a plurality of projectors disposed at a rear of the ride casing within the ride casing for projecting on divided areas on the curve screen, which areas are assigned to the projectors respectively, so that a single image is displayed thereon; and a plurality of seats arranged in a multistage condition within the ride casing so that crews sitting thereon are opposite to the curve screen, the seats disposed on a front side stage being lower than the seats disposed on a rear side stage, each row of the seats on the stages being arranged so as to describe a gentle arc so that crews sitting thereon easily direct their eyes toward the center of the curve screen in the horizontal direction;

wherein the projectors are arranged so as to cross the optical axes thereof at a position in front of the screen; and wherein the ride simulation system further comprises a plate member provided between a door installed at an entrance to the ride casing and a position opposed to the entrance on a platform, which plate is capable of assuming a vertical position for preventing access to and from the entrance, and a lying position for allowing access to and from the entrance, so that the plate member covers a gap between the ride casing and the platform and operates as a step which connects a floor surface of the entrance with a top surface of the platform when the plate member assumes the lying position.

17. The ride simulation system according to claim 16, wherein entrances to the ride casing are provided on both sides of the ride casing, one entrance is only for the comings of crews whereas the other entrance is only for the goings of crews, and the plate members are provided on corresponding positions in front of the two entrances respectively.

* * * * *